June 2, 1964 W. H. MOLES ETAL 3,135,825

BURST DETECTOR AND AUTOMATIC CHROMA CONTROL

Filed Feb. 13, 1961 2 Sheets-Sheet 1

INVENTORS
WARREN H. MOLES &
ROLAND N. RHODES
BY
W. W. Sponagle
Attorney

BURST DETECTOR AND AUTOMATIC CHROMA CONTROL

Filed Feb. 13, 1961 2 Sheets-Sheet 2

INVENTORS
WARREN H. MOLES &
ROLAND H. RHODES
BY
W. H. Sprague
Attorney 3,135,825
Patented June 2, 1964

3,135,825

BURST DETECTOR AND AUTOMATIC CHROMA CONTROL

Warren H. Moles, Trenton, N.J., and Roland N. Rhodes, Levittown, Pa., assignors to Radio Corporation of America, a corporation of Delaware Filed Feb. 13, 1961, Ser. No. 88,713
9 Claims. (Cl. 178—5.4)

This invention relates generally to color television, and particularly to apparatus for effecting synchronous detection of periodically recurring color synchronizing bursts.

It is usual in color television receivers to provide separate amplifying channels for the luminance and chrominance components of received color television signals. The chrominance component comprises phase and amplitude modulated color subcarrier frequency waves. The color subcarrier and its sidebands produced as a result of the modulation, occupy a band of frequencies which suitable bandpass circuitry may select to the relative exclusion of the band occupied by the lower frequency luminance signals. The output of the chrominance amplifier is supplied to synchronous color demodulators for recovery of the chrominance information, usually in the form of color-difference signals, for combination with the luminance signal output of the luminance amplifier in suitable color image reproducing apparatus.

The saturation of the colors in the reproduced color image is influenced by the ratio of magnitudes of the luminance and chrominance components. For a variety of reasons, undesired variations in said ratio, not reflecting actual saturation changes, may occur. To prevent such undesired ratio variations from introducing spurious saturation changes in the reproduced image, it is a known practice to correct said undesired variations by altering the magnitude of the chrominance component, usually by altering the gain of the chrominance amplifier in response to an appropriate control voltage.

Accompanying the chrominance component in the standard color television signal and falling within the passband of the chrominance amplifier is a color synchronizing component comprising periodically recurring bursts of color subcarrier frequency waves, the bursts having reference amplitude and phase. Undesired variations in the magnitude of the chrominance component are reflected in variations in the amplitude of the bursts, which nominally should appear with constant amplitude. Detection of the burst amplitude thus provides the information required for the aforementioned corrective alteration of chrominance amplifier gain, and hence a burst amplitude detector serves as an appropriate source of control voltage for chrominance amplifier gain control. This automatic chrominance amplifier gain control function is usually called automatic chroma control or ACC.

Another control function usually associated with the chrominance amplifier of a color television receiver is the co-called color killer function. It is generally considered desirable to disable the chrominance amplifier of a receiver when monochrome signals are being received, or when color television signals are being received under conditions causing appearance of the color synchronizing components with insufficient amplitude to properly synchronize the color demodulation operations. Again, as for the ACC function, a burst amplitude detector constitutes an appropriate source of information for the control of the disabling or enabling of the chrominance amplifier. When bursts disappear from the received television signal (as during a monochrome broadcast) or appear with anamplitude below some predetermined usable level, a control voltage can be developed which disables the chrominance amplifier, the amplifier remaining in the disabled condition until bursts reappear with a usable amplitude level.

Burst amplitude information may be obtained by use of simple peak detector circuitry responding to an output of the receiver's burst separator. However, such detection apparatus suffers the drawback of being subject to noise actuation; i.e. the detector responds substantially equally well to noise (of suitable frequency) in the burst separator output and actual burst signals. Thus, for example, during a monochrome broadcast when the chrominance amplifier is desirably being maintained in a disabled condition, the appearance of noise of suitable frequency in the burst separator output may cause development by the burst detector of an enabling voltage which opens up the chrominance channel. For noise immuity purposes, therefore, it has been recognized that the burst detector providing a control voltage output for ACC and/or color killer purposes may preferably be a synchonous detector.

The present invention is directed to a novel synchronous detection arrangement which may serve advantageously in the detection of the amplitude or recurring bursts. In accordance with embodiments of the present invention, a burst detector is provided with appreciable noise immunity in a circuit arrangement possessing significant practical advantages. Such advantages include the development of a high level output with high efficiency, the requirement of only single ended sources of signal inputs to the detector, and substantial isolation between the signal inputs to the detector.

In accordance with a preferred embodiment of the present invention, a tube with grid control, such as a simple triode, serves as the detecting device. Separated bursts are capacitively coupled to the anode of the triode, and oscillations from the receiver's reference color oscillator are applied to the cathode of the triode. Keying pulses, timed to coincide with the recurring bursts, are applied in a conduction enhancing polarity to the control grid of the triode. A grid leak bias network associated with the control grid responds to the driving of the cathode with the local color reference oscillations and the driving of the control grid with the keying pulses such as to set up a bias which permits conduction in the triode only during relatively short intervals corresponding to the negative peaks of the applied local oscillations, and only during such peaks as occur during the keying pulse interval. A positive energizing potential is applied to the anode through impedances selected so that the anode is maintained at D.C. potential only slightly above zero. The brief periods of conduction of the triode have the effect of clamping those portions of the applied bursts which coincide in time with the negative peaks of the local reference oscillations at a substantially zero direct current (D.C.) potential. The phase of the local reference oscillations applied to the cathode is selected so that when the receiver is in a properly synchronized condition, the aforesaid coinciding portions of the applied bursts will comprise the positive peaks thereof. As a result of the clamping of the positive peaks of the bursts at a substantially zero potential, the anode will be swung negatively away from zero potential by the remaining burst portions, developing a negative charge on the burst coupling capacitor which holds throughout the trace interval between bursts. An integrating capacitor in the anode output circuit develops a smooth negative D.C. voltage output, the amplitude of which will vary directly in accordance with variations in the amplitude of the applied bursts.

In contrast with the regular clamping of the positive peaks of the applied bursts, noise, having a random phase relationship to the local oscillations, will be clamped at varying points in its cycle resulting in both positive and negative swings away from zero potential during the intervals between conduction periods. Integration of such noise swings by the output capacitor will result in the development of substantially zero D.C. voltage.

Other embodiments of the present invention are contemplated wherein the phase of the applied local oscillations is selected so that negative peaks of the applied bursts are effectively clamped at zero potential. In such embodiments, the control voltage output is a positive polarity voltage varying directly in accordance with burst amplitude variations. The particular polarity of output desired will of course depend upon the form of ACC and/or color killer circuitry employed in the receiver. It is also contemplated that the detection apparatus of the present invention may be used to advantage as the phase detector in a system for automatic phase and frequency control of the local color oscillator. In such a utilization, the control voltage output would be applied to a reactance tube (or other variable reactance device) to control the frequency and phasing of the local color oscillations applied to the detector. In such an arrangement, the detector would tend to maintain a phase quadrature relationship between the applied oscillations and the applied bursts.

A primary object of the present invention is to provide novel and improved burst detection apparatus.

A particular object of the present invention is to provide burst detection apparatus having substantial noise immunity.

A further specific object of the present invention is to provide a relatively simple, noise immune, synchronous burst amplitude detector having a relatively high level output suitable for use in performing ACC and/or color killer functions in a color television receiver.

Other objects and advantages of the present invention will be apparent to those skilled in the art after a reading of the following detailed description and an inspection of the accompanying drawings in which.

Figures 3A, 3B, 3C:
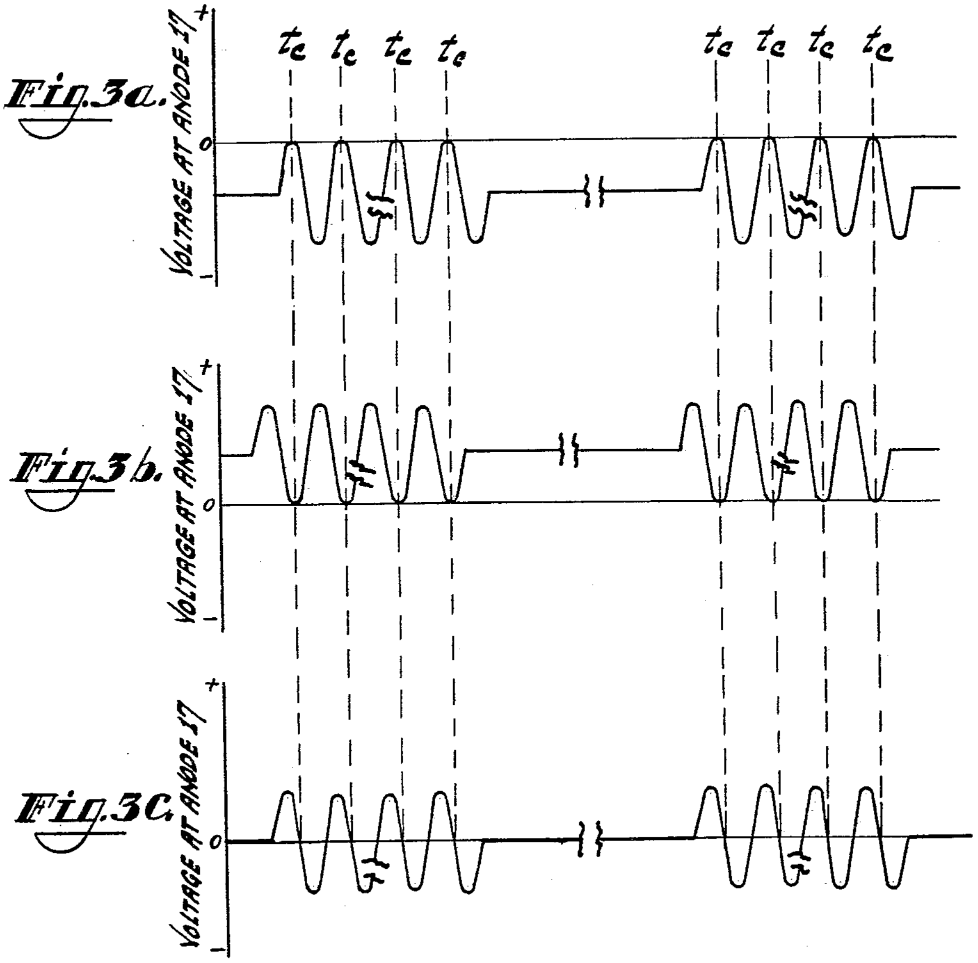

FIGURE 3A, 3B, and 3C illustrate graphically voltage waveforms of aid in explaining the operation of the illustrated apparatus.

Figure 1:
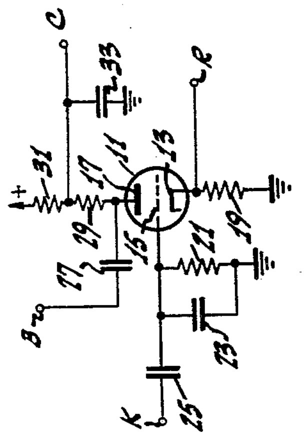
FIGURE 1 illustrates schematically burst detection apparatus in accordance with an embodiment of the present invention.

In the circuit of FIGURE 1, a triode 11 serves as the burst detecting device. The cathode 13 of triode 11 is returned to a point of reference potential (e.g. chassis ground) by means of a cathode resistor 19. Reference color oscillations from a suitable local source, not shown in FIGURE 1, appear at a reference oscillation input terminal R, and are directly applied therefrom to the cathode 13.

The anode 17 of triode 11 is returned to a source of positive direct current potential (indicated by a + sign) by means of a pair of anode resistors 29 and 31 connected in series in the order named between the anode 17 and the D.C. potential source. Resistor 31 is quite large relative to resistor 29; also the total impedance presented by the series combination of resistor 29 and resistor 31 is very large compared with the impedance presented by the series combination of cathode resistor 19 and triode 11 when the latter is conducting. Separated color synchronizing bursts from a suitable burst source, not shown in FIGURE 1, appear at a burst input terminal B, and are applied to anode 17 by means of a coupling capacitor 27.

The control grid 15 of triode 11 is returned to the reference potential point by means of a grid leak resistor 21 shunted by a bypass capacitor 23. Periodically recurring positive-going keying pulses from a suitable keying pulse source, not shown in FIGURE 1, appear at a keying pulse input terminal K, and are applied to the control grid 15 by means of a coupling capacitor 25.

An output integrating capacitor 33 is coupled between the junction of anode resistors 29 and 31 and the reference potential point. A direct current control voltage output, developed across output capacitor 33, appears at a control voltage output terminal C, which is directly connected to the resistor junction point. The control voltage output is applied from output terminal C to suitable control voltage utilization apparatus, not shown in FIGURE 1.

Grid leak bias developed across the grid leak combination 21—23 in response to the application of oscillations to cathode 13 and augmented by the keying pulse application maintains the tube 11 in a non-conducting state except for a succession of brief conducting periods corresponding in time to the negative peaks of the applied oscillations which occur within the keying interval. The relative magnitudes of the positive energizing potential for anode 17, the impedances presented by resistors 31, 29, 19 and conducting triode 11, and the negative peak amplitude of the local reference oscillations are chosen so that the potential to which the anode 17 is effectively "clamped" during each conducting period is substantially zero potential. The relative magnitudes of resistors 29 and 31 are such (resistor 31 being quite large relative to resistor 29) that the D.C. output appearing across capacitor 33 in the absence of burst application (as during monochrome reception) is only slightly above zero potential. When bursts are applied through capacitor 27 to the anode 17 in a phase reversed 180° relative to the phase of the oscillations on cathode 13, the positive peaks of the applied bursts are clamped at substantially zero potential. This effect is demonstrated graphically in the FIGURE 3A plot of the voltage variations at anode 17 under the assumed phasing condition. The dotted vertical lines designated $t_c$ in FIGURE 3A (as well as in the subsequent FIGURES 3B and 3C) indicate the timing of the negative peaks of the local oscillations when conduction in tube 11 is permitted. During the non-conducting intervals between conducting periods the anode 17 swings negatively from zero potential. These negative swings are integrated by capacitor 33 to develop a negative D.C. voltage, the magnitude of which will vary in direct accordance with the amplitude of the applied bursts. There is thus available at output terminal C a control voltage which is substantially zero in the absence of applied bursts, but which appears negative when bursts are applied, the level of the negative voltage increasing with increases in burst amplitude. The usefulness of such a control voltage output in achieving the previously mentioned ACC and color killer functions will be demonstrated subsequently.

For certain ACC and/or color killer circuits, it may be desired that the burst responsive control voltage have a positive polarity. A control voltage output of such polarity may be provided by the circuit of FIGURE 1 if the phase relationship between applied bursts and local oscillations is altered to an in-phase relationship. Under the latter condition of phasing, the negative peaks of the applied bursts are clamped at substantially zero potential, as shown graphically in the plot of FIGURE 3B; thus, the anode 17 swings in a positive direction away from zero potential during the non-conducting intervals between conducting periods. There is thus developed across capacitor 33 a positive D.C. voltage having an amplitude varying directly with the amplitude of the applied bursts.

The circuit of FIGURE 1 may also be used to advantage in effecting the automatic phase and frequency control of the local color reference oscillator. In such a synchronizing utilization, the control voltage output may be applied to a reactance tube or other variable reactance device, to adjust the tuning of the oscillator so as to maintain a fixed phase relationship between received bursts and locally generated oscillations. In such operations, a phase quadrature relationship between bursts and local oscillations will tend to be maintained, whereby the voltage at terminal C is normally substantially zero. FIGURE 3C illustrates graphically the voltage variations at anode 17 when such a phase relationship is maintained. Departures from this phase relationship in one direction produces a control voltage of positive polarity to effect a compensating adjustment in the tuning of the oscillator; a departure in the opposite direction produces a control voltage of negative polarity so as to effect an opposite, compensating adjustment of the local oscillator tuning.

The circuit of FIGURE 1 possesses the advantage of appreciable noise immunity, an important consideration for a burst detector, particularly for color killer functions. Noise appearing at the burst input terminal B necessarily bears a random phase relationship to the local oscillations on cathode 13. Thus, the noise variation will be successively clamped at randomly varying points, both positive and negative, in its excursions about its A.C. axis. This results in both positive and negative swings away from zero potential during the intervals between conduction periods. Integration of these positive and negative swings by the output capacitor 33 thus results in the development of substantially zero D.C. voltage.

It should be noted that the burst detector of FIGURE 1 is keyed despite the fact that the burst information applied thereto is already in a separated form. Thus, keying takes place although not required for burst separation purposes. The significance of the keying action is related to the above described noise immunity advantage.

To obtain optimum noise immunity advantages from a synchronous burst detector, its response should be symmetrical with respect to phase, and, for most utilizations, preferably symmetrical about a zero output. The keyed burst detector of FIGURE 1 possesses this desirable symmetry of response, as FIGURES 3A and 3B help to demonstrate. For the in-phase relationship associated with FIGURE 3B, and the 180 degree out-of-phase relationship associated with FIGURE 3A, the responses of the detector are substantially equal in amplitude, but opposite in polarity, and thus symmetrical about zero. From previous discussions of FIGURE 3C, it will be appreciated that response is substantially zero at the intermediate 90 degree and 270 degree phase relationships. It may readily be shown that the responses for all phase conditions running from 90 degrees through 180 degrees to 270 degrees will have substantially equal counterparts of opposite polarity in the responses for phase conditions running from 270 degrees through zero degrees to 90 degrees. As a result, the long term integrated effect of an input to the phase detector consisting of noise, with its random phase relationship to the local oscillations, will be substantially zero.

The keying of the burst detector of FIGURE 1 permits achievement of this desired symmetry, as will now be demonstrated by considering the operation of the circuitry of FIGURE 1 in the absence of such keying. Considering first an anti-phasal relationship between the local oscillations and the signal applied to the plate 17, akin to that associated with FIGURE 3A, it may readily be appreciated that the same plate potential variations will occur as were shown in FIGURE 3A. Thus, during each burst interval, conduction of tube 11 will occur during each positive peak of the external signal; the remainder of the external signal will swing in a negative direction away from the zero clamping potential, developing a charge on capacitor 27 which will be held throughout the trace interval between bursts. The charge will be retained by capacitor 27 during the trace interval, despite the absence of the effects of keying wave application, since throughout the trace interval the plate 17 appears negative with respect to cathode 19, and the overcoming of cut-off bias in the grid cathode circuit during each negative peak of the local oscillations does not result in conduction of plate current.

In contrast, however, consider now what occurs in the absence of keying when the phase relationship is an in-phase condition akin to that shown in FIGURE 3B. During each burst interval, conduction of tube 11 will occur during the negative peaks of the external signal; the remainder of the external signal will swing in a positive direction away from the zero clamping potential. At the termination of the burst interval, the charge upon capacitor 27 will be positive, as in FIGURE 3B; however, this charge will not be retained throughout the trace interval. Rather, when the next succeeding negative peak of the local oscillations overcomes cut-off bias in the grid-cathode circuit, the tube 11 will be in a condition to pass plate current, since the plate 17 will be at a positive potential with respect to the cathode. Such conduction at the beginning of the trace interval will result in discharge of capacitor 27. In the absence of an incoming signal until the next burst interval, capacitor 27 will remain discharged. As a consequence, the burst detector will be unable to develop positive potentials of sufficient magnitude to counteract, for long term integration purposes, the negative potentials developed by the burst detector for phasing conditions of the type associated with FIGURE 3A. As a result of this lack of symmetry in response, noise, despite its random phase relationship to the local oscillations, can produce a spurious signal output from the detector. Where the detector output is used for color killer control purposes, this spurious signal production can result in the unkilling of the receiver's chrominance channel during a monochrome broadcast or during adverse reception conditions of a color broadcast when it is preferable to keep the chrominance channel killed.

Figure 2:
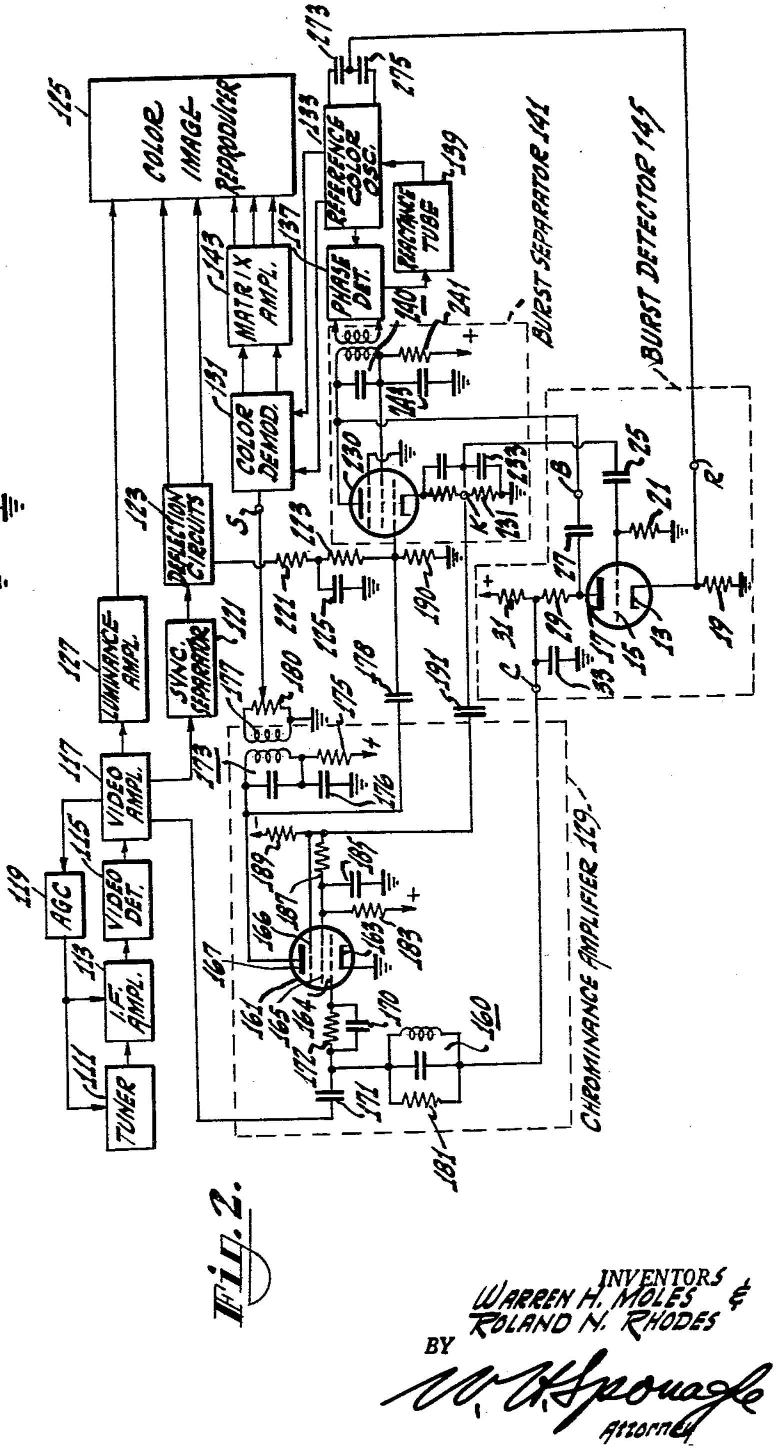
FIGURE 2 illustrates, in a combined block and schematic presentation, a color television receiver employing burst detection apparatus in accordance with an embodiment of the present invention in achievement of ACC and color killer functions.

FIGURE 2 illustrates a color television receiver employing a burst detector in accordance with the embodiment of FIGURE 1 to control both color killer and ACC functions.

The head end of the illustrated color television receiver comprises a tuner 111, which responds to the reception of broadcast television signals to produce intermediate frequency signals bearing composite television signal modulation, which signals are supplied to the intermediate frequency (IF) amplifier 113. The IF amplifier 113 output is supplied to a video detector 115, which demodulates the modulated IF carrier to recover a composite video signal. A separate detector (not illustrated) may be conventionally provided to also respond to the IF amplifier 113 output to provide, in accordance with well known intercarrier sound techniques, a sound IF signal for driving the receiver's sound channel (also not illustrated).

The output of the video detector 115 is supplied to a video amplifier 117 which amplifies the detected composite video signal, and supplies the amplified signals to a number of the operating circuits of the receiver. One of the outputs of video amplifier 117, for example, is supplied to automatic gain control apparatus 119, which may be of the well known keyed AGC variety, responding to variations in the amplitude of the deflection synchronizing pulses of the detected composite signal to produce a control potential which is used to control the gain of amplifying stages in the tuner 111 and IF amplifier 113 in a direction compensating for such variations. Another output of video amplifier 17 is applied to a sync separator 121 which separates respective horizontal and vertical deflection synchronizing pulses from the detected composite signal, the separated pulses being supplied to deflection circuits 123 to suitably synchronize the generation of deflection waves used to develop a scanning raster in the color image reproducer 125.

Another output of video amplifier 117 is supplied to a luminance amplifier 127, which serves to amplify the luminance component of the composite signal for application to the reproducer 125. Where the reproducer 125 takes the form of the well known three-beam, shadow-mask color kinescope, the luminance (Y) signal output of amplifier 127 may be conventionally applied in common to the cathodes of the three electron guns of the color kinescope. Another output of the video amplifier 117 is applied to a chrominance amplifier 129, which has a bandpass characteristic for selectively amplifying the chrominance component of the detected composite signal, the chrominance component comprising the color subcarrier and its sidebands. The chrominance amplifier 129 output is applied to color demodulators 131 for synchronous demodulation of the color subcarrier to produce color-difference signal outputs.

To effect the desired synchronous demodulation, a local source of unmodulated subcarrier frequency waves of a reference phase is required. Such a source is constituted by reference color oscillator 133, which nominally operates at the color subcarrier frequency, and which is controlled in frequency and phase by AFPC apparatus comprising a phase detector 137 comparing the oscillator 133 output with received color synchronizing bursts to derive control information for adjusting a reactance tube 139 associated with the frequency determining circuits of the oscillator 133.

The color synchronizing burst input to the phase detector 137 is supplied from a burst separator 141, which comprises a gate circuit coupled to the output of chrominance amplifier 129 and controlled by suitably timed gating pulses (derived from the deflection circuits 123 in a manner to be described subsequently) to pass signals only during the recurring time intervals occupied by the color synchronizing bursts.

Where the color image reproducer 125 is of the aforementioned three-beam, shadow-mask color kinescope type with luminance-driven cathodes, it is usual to require the chrominance information supplied to the reproducer to be in the form of red, green and blue color-difference signals ($R-Y$, $G-Y$ and $B-Y$) for separate application to respective ones of the control grids of the kinescope's three electron guns. While signals of such form may be derived from the modulated color subcarrier waves directly through the use of three demodulators operating at the respective phases associated with these color difference signals, it is common practice, for a variety of reason including circuit economy, to rather utilize only two color demodulators with subsequent matrixing apparatus for converting the demodulator outputs to the desired signal forms. In accordance with such practice, the illustrated receiver employs a matrix amplifier 143, operating on the outputs of demodulators 131 to develop the desired color difference inputs for the color image reproducer 125.

For further details of a receiver of the general type described above, reference may be made, for example, to the RCA Service Data Pamphlet No. 1960 T–5, illustrating the CTC–10 color television receiver chassis manufactured by Radio Corporation of America.

The chrominance amplifier 129, and the burst separator 141 are shown in schematic detail, as is burst detector apparatus 145 of the form contemplated by the present invention. The burst detector 145 responds to the output of burst separator 141 to develop a single control voltage output which is applied to the chrominance amplifier 129 to accomplish both color killer and ACC functions therein. The illustrated chrominance amplifier is of the "self-killing" type. An example of chrominance amplifiers of the self-killing type is found in U.S. Patent No. 2,894,061, issued to Oakley and Rhodes on July 7, 1959. The particular form of self-killing chrominance amplifier illustrated in FIGURE 2 is described in detail in a copending application, Serial No. 88,961, of Albert Macovski, entitled "Chrominance Channel Control Apparatus," and filed concurrently herewith, and now U.S. Patent No. 3,070,654, issued December 25, 1962. A description of such apparatus and its mode of operation in connection with the present invention will be given subsequently.

The chrominance signal amplifying device is illustratively shown as a pentode 161. Chrominance signals, from an output of the video amplifier 117, are supplied to an input circuit associated with the cathode and first grid electrodes 163 and 164, respectively of the pentode 161. Specifically, the chrominance signal is applied via a path including a coupling capacitor 171 and a series grid resistor 172 (bypassed for chrominance signal frequencies by a capacitor 170). Bandpass filtering apparatus for selecting the chrominance signal component to the relative exclusion of the low frequency luminance component of the composite color television signal processed by the video amplifier 117 is provided by a suitably tuned parallel resonant circuit 160 (shunted by a damping resistor 181) coupled between the junction of capacitor 171 and resistor 172 and the control voltage output terminal C of burst detector 145. The cathode 163 is directly returned to a point of reference potential (e.g., chassis ground potential).

A tuned output circuit is associated with the anode 167 of the chrominance amplifier tube 161, across which output circuit an amplified version of the chrominance signal input may appear. Specifically, the anode circuit of tube 161 includes a parallel resonant circuit 173 interposed in series with an anode resistor 175 in the connection of the anode 167 to a source (indicated +) of suitable positive operating potential. The anode resistor 175 is bypassed by capacitor 176. The parallel resonant circuit 173 is tuned to present an appreciable impedance at the frequencies of the chrominance signal component, and serves as farther chrominance signal bandpass selection apparatus. An output winding 177 is mutually inductively coupled to the inductance element of the parallel resonant circuit 173. The chrominance signal input terminal S of color demodulators 131 is supplied with an adjustable input via its connection to the movable arm of a saturation control potentiometer 180, having its fixed terminals connected respectively to opposite ends of winding 177. A chrominance signal path to the input of the burst separator 141 is provided from the anode end of the parallel resonant circuit 173 by means of a coupling capacitor 178.

In the performance of the previously mentioned automatic chroma control function, it is desired to vary the gain of the chrominance amplifier circuit inversely with respect to the undesired variations in the chrominance signal amplitude. To achieve this desired gain control, a control voltage input, comprising a direct current voltage representative of the undesired chrominance signal variations, is applied as a variable bias to the control grid 164 of tube 161. The control voltage, developed in the burst detector 145 as previously described, appears at the control voltage output terminal C, and is applied therefrom via a direct current path to the control grid 164. The control voltage, illustratively of a negative D.C. polarity, becomes less negative when the undesired chrominance signal variation causes a decrease in chrominance signal amplitude, and becomes more negative when the undesired chrominance signal variation causes an increase in chrominance signal amplitude. The bias variation introduced by the control voltage application causes a variation in the gain of the chrominance amplifier stage which tends to compensate for the undesired variation of the chrominance signal input amplitude. With the control voltage being responsive to the output of burst separator 141, in turn responsive to the output of the chrominance amplifier stage, a closed loop gain control system is provided which may serve to accurately maintain the chrominance signal input to the color demodulators 131 substantially free of undesired amplitude variations.

In the apparatus described in the aforementioned Macovski patent, means are provided in addition to those chrominance amplifier circuit components heretofore described, for accomplishing the color killer function in the same chrominance amplifier stage, and utilizing as controlling information the same control voltage input which serves to provide the automatic chroma control function. To appreciate how this is accomplished, one must now consider the circuitry associated with two additional electrodes of the tube 161, viz., screen grid 165 and third grid 166. The screen grid 165 is returned to a source of positive D.C. potential by means of a resistor 183. The screen resistor 183 is bypassed for chrominance signal frequencies by capacitor 185. The third grid 166 of tube 161 is connected to an intermediate point of a voltage divider formed by the screen resistor 183, a resistor 187 providing a D.C. interconnection between the grids 165 and 166, and a resistor 189 connected between the third grid 166 and a source of negative D.C. potential.

The values of resistors 183, 187 and 189 are chosen so that, under normal gain conditions for the chrominance amplifier, the junction between resistors 187 and 189 to which third grid 166 is connected is at a suitable positive D.C. potential relative to the cathode 163. However, as the burst amplitude decreases, causing the control voltage input to grid 164 to go in the positive direction to introduce a compensating gain increase, the screen grid 165 draws an increasing amount of current. This increase in screen current causes an increased voltage drop across resistor 183. As a consequence, the junction between resistors 187 and 189 swings in a negative direction, driving the third grid 166 more negative. When the gain increase becomes sufficient to drive grid 166 more negative than the cathode 163, the third grid 166 diverts current from the plate 167 to the screen grid 164. A regenerative action ensues, with the increased screen current driving grid 166 further in the negative direction, causing still greater diversion of current from plate to screen. As a result, the plate is quickly driven to cut-off, with substantially all of the cathode emission current flowing to the screen grid 65. Under such conditions the output circuit associated with the plate 167 is no longer supplied with the chrominance signals for application to demodulators 131, and the receiver stands in a color killed condition, the appropriate condition to be obtained when burst amplitude decreases below a useful level or when burst disappears at the beginning of monochrome transmission.

Thus, the desired color killer action is achieved in the same chrominance amplifier stage that is subjected to automatic chroma control. Indeed, a single control voltage input suffices to accomplish both functions in the controlled amplifier stage. The color killing action, furthermore, is achieved without need for a separate color killer device as usually required.

In view of the fact that the burst separator 141 derives its input from the plate 167 of tube 161, a difficulty is imposed in accomplishing the "unkilling" of the chrominance channel once it is killed. In other words, to remove the negative potential from the third grid 166 which is maintaining the plate 167 cutoff, the burst separator 141 must be able to recognize the return of a burst of appropriate amplitude whereby to derive a control voltage sufficiently more negative to reduce the screen current. In the FIGURE 2 circuit, to assure such capability to effect unkilling when appropriate, keying pulses of positive polarity, timed to coincide with the burst interval, are applied to the third grid 166. Specifically, keying pulses of the desired characteristic, derived from the deflection circuits 123 (in a manner to be described subsequently), appear at a keying pulse supply terminal K, which is in turn coupled via capacitor 191 to the third grid 166. The keying pulse amplitude is chosen, relative to the negative D.C. potential at which the third grid 166 is maintained during color killing by the action of the voltage divider 183, 187, 189, so that the grid 166 is driven sufficiently positively during the burst interval that any burst appearing in the input signal will be permitted to pass to the plate 167 for application to the burst separator 141. If the burst thus passed is of sufficiently large amplitude, it will cause generation of a control voltage by burst detector 145, which control voltage will be sufficiently negative to decrease the current drawn by screen grid 165 to a level permitting the third grid 166 to swing more positive than the cathode 163. The chrominance amplifier 129, thus, is made operative to amplify the chrominance signal.

The illustrated details of the burst detector 145, which effects control of the self-killing chrominance amplifier 129 of FIGURE 2 in the manner described above, comprise circuitry in accordance with an embodiment of the present invention. The burst detector 145 utilizes the triode 11 in a circuit configuration comparable to that shown in FIGURE 1. Thus, local color oscillations appearing at the reference oscillation input terminal R are applied to the cathode 13 of triode 11 and appear across cathode resistor 19. The source of reference oscillations is the reference color oscillator 133; terminal R is connected to an intermediate point on a capacitance divider 273—275 coupled across the tank circuit (not shown) of the oscillator 133.

Color synchronizing bursts appearing at the burst input terminal B are applied to the anode 17 of triode 11 via capacitor 27. The bursts are caused to appear at terminal B by means of a direct connection betweeen terminal B and the high potential end of a parallel resonant circuit 240 (tuned to the burst frequency) located in the plate circuit of the burst separator tube 230. The low potential end of resonant circuit 240 is returned to a source of positive operating potential for the plate of tube 230 by means of a resistor 241; the resistor 241 is bypassed for chrominance signal frequencies by capacitor 243.

Positive going keying pulses, timed to occur in coincidence with each burst interval, appear at the keying pulse input terminal K and are applied via capacitor 25 to the control grid 15 of triode 11. It may be noted that the terminal K is located at the high potential end of a cathode resistor 231 arranged in the cathode circuit of the burst separator tube 230. The cathode resistor 231 is bypassed for chrominance signal frequencies by capacitor 233. The burst separator tube 230 is normally non-conducting, but is periodically driven into conduction during successive periods corresponding to the burst intervals by the application of keying pulses to its control grid. These keying pulses are derived from the deflection circuits 123 and may comprise, for example, horizontal flyback pulses taken from the horizontal output transformer of the horizontal deflection circuit and suitably modified by a shaping network 221—223—225 (of a well known integrating type) to occur in substantial time coincidence with only the burst interval portion of the horizontal retrace period.

The control voltage output terminal C of burst detector 145 is connected to the junction of the series anode resistors 29 and 31, and an integrating capacitor 33 is coupled between said junction and ground.

The operation of the burst detector 145 is as described for the apparatus of FIGURE 1. Thus, during normal color reception where bursts are received of sufficient amplitude to properly synchronize oscillator 133, the bursts appear at the anode 17 in an anti-phase relationship with the local oscillations appearing at cathode 13. The positive peaks of the applied bursts are effectively clamped at substantially zero potential, with the resultant waveform at anode 17 as shown in FIGURE 3A. This voltage waveform is smoothed by capacitor 33 to provide at output terminal C a negative D.C. voltage. This negative D.C. voltage increases in amplitude with increases in the amplitude of the applied bursts, and decreases in amplitude with decreases in amplitude of the applied bursts. The control voltage output is thus suitable for performing the ACC function desired during color reception by application thereof to chrominance amplifier 129. When bursts disappear, as during monochrome reception, or decrease in amplitude below the level required for properly synchronizing oscillator 133, the control voltage output decreases toward zero, with the resultant self-killing effect on chrominance amplifier 129, as previously described.

In the killed condition, a path is still available for signals occurring during the burst interval to be supplied to the anode 17. Thus, when bursts do reappear with the proper amplitude, the burst detector 145 may develop at terminal C a voltage sufficiently negative to eliminate the self-killing effect on chrominance amplifier 129. However, if, while the receiver is in the killed condition, noise disturbances occurring during the burst interval are supplied to the anode 17, the output voltage at terminal C will not depart from its substantially zero value, whereby the receiver will remain in a killed condition. As noted previously, such a result is assured by the symmetry of the response of the burst detector 145 to variations in phase of the signal delivered to anode 17.

Certain practical advantages of the use of the circuitry of the present invention in performing the functions of burst detector 145 should be readily apparent. By virtue of the use of clamping action in the output voltage development, a high level output is readily attainable from the detector circuit. No push-pull sources of input signals required; rather, single ended sources of burst and local oscillations are used. Substantial isolation between the respective signal inputs to the detector is readily obtained by virtue of the use of the triode cathode and anode electrodes as the respective input terminals. It may be noted at this point that, in accordance with another contemplated embodiment of the present invention, the local color oscillations may be applied to the control grid 15, rather than to the cathode 13. However, the illustrated embodiment appears to be preferable over such a modification for several reasons, an important one of which is the improved isolation between inputs obtained when the oscillations are supplied to the cathode of the triode rather than to the grid.

It should be observed that, whereas the illustrated embodiments of the invention utilize separated bursts as the input to the detector anode, the keyed character of the detector will permit operation with a composite signal input to the anode, i.e. without requiring pre-separation of the burst from the chrominance signal. However, in the usual receiver incorporating a burst separator, burst gain considerations will generally suggest use of the burst separator output as the preferred source of bursts for detector utilization. It may also be noted that, while FIGURE 2 has particularly illustrated use of the detector output in the control of a self-killing chrominance amplifier, the present invention is not restricted to such use, the control voltage output of the described burst detector being useful in conjunction with a variety of color killer circuits, ACC circuits, etc.

A particular set of values for the circuit constants of detector 145 of FIGURE 2 which has provided satisfactory operation is set forth below. It will be appreciated that these values are given by way of example only:

| | |
|---|---|
| Resistor 19 | 330 ohms. |
| Resistor 21 | 2.7 megohms. |
| Resistor 29 | 100K. |
| Resistor 31 | 4.7 megohms. |
| Capacitor 25 | .005 microfarad. |
| Capacitor 27 | 180 micromicrofarads. |
| Capacitor 33 | .047 microfarad. |
| Tube 11 | (½) 12AT7. |

What is claimed is:

1. In a color television receiver including a source of reference color oscillations, a burst separator responding to received signals to provide an output comprising separated color synchronizing bursts, and a source of keying pulses occurring in substantial time coincidence with said bursts; synchronous burst detection apparatus comprising in combination an electron discharge device including an anode, a cathode and a control grid, means for applying reference color oscillations from said first named source to said cathode, means for applying separated color synchronizing bursts from said burst separator output to said anode, means for applying keying pulses from said second named source to said control grid, and means for deriving an output voltage from said anode.

2. In a color television receiver including a color oscillator, a burst separator, and a source of pulses timed to substantially coincide with received bursts; a burst detector comprising a signal translating device having an input electrode, an output electrode and a common electrode, means for coupling said output electrode to an output of said burst separator, means for coupling said common electrode to an output of said color oscillator, means for coupling said input electrode to an output of said pulse source, and means for deriving a detector output signal from said output electrode.

3. In a color television receiver including an amplifying channel for amplifying chrominance signals and accompanying color synchronizing bursts, a burst separator responding to an output of said amplifying channel for selectively passing only said synchronizing bursts to an output circuit thereof, and apparatus for developing periodically recurring pulses corresponding in time to the intervals of occurrence of said bursts; apparatus comprising the combination of a triode having anode, cathode and control grid electrodes, means for applying bursts from said burst separator output circuit to said anode electrode, means for applying pulses from said developing apparatus to said control grid electrode in a conduction enhancing polarity, a source of local color oscillations, means for applying oscillations from said source to said cathode electrode, means for deriving a control voltage output from said anode electrode, and means for applying said control voltage output to said amplifying channel.

4. In a color television receiver adapted to receive composite color television signals including a luminance component, a chrominance component and color synchronizing bursts, frequency selective means for amplifying said chrominance component and said color synchronizing bursts to the relative exclusion of said luminance component, a gate circuit responding to an output of said amplifying means, means for applying gating pulses to said gate circuit to cause actuation thereof during the times of occurrence of said color synchronizing bursts, a resonant output circuit coupled to said gate circuit in which bursts passed by said gate circuit appear, an electron discharge device including an anode and a pair of input electrodes, an impedance coupling said anode to a point of said fixed potential, capacitive means for coupling said anode to said resonant output circuit, biasing means coupled to one of said input electrodes and responsive to gating pulses for preventing conduction of said electron device during times other than the times of occurrence of said bursts, a source of oscillations nominally of burst frequency, means including a coupling between said oscillation source and one of said input electrodes for restricting conduction by said electron discharge device within each time of burst occurrence to a succession of brief intervals corresponding to peaks of said oscillations of a predetermined polarity, and means for controlling said amplifying means in accordance with variations of potential at said anode.

5. Apparatus for synchronously detecting periodically recurring bursts of oscillations of a reference frequency comprising in combination a local source of oscillations nominally of said reference frequency; a signal translating device having an output electrode, and first and second additional electrodes, and adapted to prevent passage of current to said output electrode unless a predetermined cut-off bias between said additional electrodes is exceeded; a source of keying pulses in time coincidence with said periodically recurring bursts; biasing means responsive to said keying pulses and to oscillations from said local source for maintaining a cut-off bias between said additional electrodes which is exceeded only during the occurrence of local oscillation peaks of a given polarity within each recurring burst period; a series combination comprising a capacitance in series with a resistive impedance; means for applying said bursts across said series combination; means for utilizing said signal translating device to establish the junction of said capacitance and said resistive impedance at a substantially zero direct current potential during each of the instances when said cut-off bias is exceeded, said utilizing means including a direct current connection between said output electrode and said junction; and means for integrating potential variations appearing across said resistive impedance to develop a direct current potential output.

6. In a color television receiver including a source of reference color oscillations, a burst separator responding to received signals to provide an output comprising separated color synchronizing bursts, and a source of keying pulses occurring in substantial time coincidence with said bursts; synchronous burst detection apparatus comprising in combination an electron discharge device including anode, cathode and control grid electrodes, means for applying reference color oscillations from said first named source to one of said cathode and control grid electrodes, means for applying separated color synchronizing bursts from said burst separator output to said anode, means for applying keying pulses from said second named source to one of said cathode and control grid electrodes, and means for deriving an output voltage from said anode.

7. In a color television receiver including a channel for amplifying chrominance signals and accompanying color synchronizing bursts, a burst separator responding to an output of said amplifying channel for selectively passing only said synchronizing bursts to an output circuit thereof, and apparatus for developing periodically recurring pulses corresponding in time to the intervals of occurrence of said bursts; apparatus comprising the combination of an electron tube having anode, cathode and control grid electrodes, a capacitance coupled between said burst separator output circuit and said anode electrode, a control circuit coupled to said cathode and control grid electrodes, means for applying pulses from said developing apparatus to said control circuit, a source of local color oscillations, means for applying oscillations from said source to said control circuit, said control circuit responding to the application of said pulses and said local color oscillations to develop a bias between said cathode and control grid electrodes which permits the flow of anode current in said electron tube only during local color oscillation peaks of a single given polarity which occur within recurring time periods corresponding to the recurring intervals of occurrence of said bursts, means responsive to charges developed by said capacitance in response to the periodic flow of anode current in said electron tube for deriving a direct current potential output, and means for controlling said amplifying channel in accordance with said direct current potential output.

8. Apparatus in accordance with claim 3 wherein said control voltage output applying means is adapted to vary the gain of said amplifying channel inversely with respect to variations in the amplitude of said bursts applied to said anode electrode during the reception of chrominance signals and accompanying bursts.

9. Apparatus in accordance with claim 4 wherein said controlling means varies the gain of said amplifying means in response to variations in the amplitude of said bursts.

References Cited in the file of this patent

UNITED STATES PATENTS

| | | |
|---|---|---|
| 2,879,329 | Larky | Mar. 24, 1959 |
| 2,961,484 | Macovski | Nov. 22, 1960 |
| 3,012,094 | Smith et al. | Dec. 5, 1961 |